(12) United States Patent
Krappe

(10) Patent No.: US 9,904,905 B2
(45) Date of Patent: Feb. 27, 2018

(54) DOCUMENT-BASED USER INTERFACES CONTROLLED AND MANAGED BY A SYSTEM

(71) Applicant: Kirk Krappe, Portola Valley, CA (US)

(72) Inventor: Kirk Krappe, Portola Valley, CA (US)

(73) Assignee: Apttex Corporation, San Mateo, CA (US)

( * ) Notice: Subject to any disclaimer, the term of this patent is extended or adjusted under 35 U.S.C. 154(b) by 113 days.

(21) Appl. No.: 13/705,189

(22) Filed: Dec. 5, 2012

(65) Prior Publication Data
US 2014/0157117 A1 Jun. 5, 2014

(51) Int. Cl.
*G06F 17/20* (2006.01)
*G06Q 10/10* (2012.01)
*G06F 17/21* (2006.01)

(52) U.S. Cl.
CPC .................................. *G06Q 10/10* (2013.01)

(58) Field of Classification Search
CPC ............................... G06F 17/20; G06F 17/211
USPC ........................................................ 715/255
See application file for complete search history.

(56) References Cited

U.S. PATENT DOCUMENTS

| | | | | |
|---|---|---|---|---|
| 7,296,217 | B1* | 11/2007 | Earnshaw | G06Q 10/10 705/317 |
| 2003/0033167 | A1* | 2/2003 | Arroyo | G06Q 10/06398 705/301 |
| 2003/0046639 | A1 | 3/2003 | Fai et al. | |
| 2003/0144982 | A1* | 7/2003 | Reulein | G06F 17/243 |
| 2005/0223025 | A1* | 10/2005 | Bennett, Jr. | 707/102 |
| 2006/0225032 | A1* | 10/2006 | Klerk | G06Q 10/10 717/105 |
| 2007/0150387 | A1* | 6/2007 | Seubert | G06Q 10/10 705/31 |
| 2007/0245227 | A1* | 10/2007 | Hyland | G06Q 10/10 715/234 |
| 2008/0215474 | A1 | 9/2008 | Graham | |
| 2010/0070930 | A1* | 3/2010 | Thibault | G06Q 10/10 715/854 |
| 2010/0293503 | A1* | 11/2010 | Toussaint | G06Q 10/06 715/804 |
| 2011/0145153 | A1* | 6/2011 | Dawson et al. | 705/80 |
| 2014/0122200 | A1* | 5/2014 | Granville | 705/14.14 |

* cited by examiner

*Primary Examiner* — James J Debrow
(74) *Attorney, Agent, or Firm* — HM Law Group LLP; Vani Moodley, Esq.

(57) ABSTRACT

Document-based user interfaces controlled and managed by a system. A business management application that runs on a platform of the system determines data entry, by a user, in a document creation application. The business management application further interacts with the data using a web services application interface, and invokes a rule that enables behavior of the document creation application being controlled by the system. Further, the business management application assigns regulatory controls to the document creation application until completion of an approval process and subsequently relinquishes the rule on completion of the approval process.

30 Claims, 5 Drawing Sheets

DOCUMENT-BASED USER INTERFACES CONTROLLED AND MANAGED BY A SYSTEM

REFERENCE TO PRIORITY APPLICATION

This application claims priority from U.S. application Ser. No. 13/423,280 filed Mar. 19, 2012, entitled "LINKING STRUCTURED DATABASE MANAGEMENT SYSTEMS WITH DOCUMENT CREATION AND WORD PROCESSING TOOLS", which is incorporated herein by reference in their entirety.

TECHNICAL FIELD

The invention relates to the field of business management. More specifically, the invention relates to document-based user interfaces controlled and managed by a system.

BACKGROUND

Increased availability of computer systems and an ability to connect the computer systems using various networks, for example intranets and the Internet, has made vast repositories of information and cloud-managed software applications available to users. In many instances, having such vast amounts of information available to the users enhances productivity. Additionally, with increase in number of applications that users need to learn and use, there has been a massive proliferation of user interfaces. Every new application has a different user interface that consumers or users need to learn in order to use the applications.

Such advances in information accessibility and processing have created other challenges, for example management of the vast amounts of information and requiring learning of many and multiple user interfaces. Many new tools have been developed to deal with an ever-expanding volume of information that is now available for consumption in an electronic form.

Some approaches to managing the increase in the number of user interfaces are to aggregate the user interfaces into a single easy to use and familiar user interface. Indeed, it is highly useful to aggregate the user interfaces into an easy to use and familiar user interface so that the user interfaces are simpler to use and run applications, for example applications for managing customer or partner engagement, managing the contract process/lifecycle proposal processes or business processes, and for automatically generating different types of documents or electronic mails.

However, despite an ability to manage business relationships and other content, through an application with access to a system, for example a structured database management system or software application, most of the business relationships or the other content are memorialized using word processing software or other desktop documents and managed by manual human analysis.

SUMMARY

The above-mentioned needs are met by a computer-implemented method, a computer program product, and a system for controlling behavior of document-based user interfaces by actions performed from a system.

An example of a computer-implemented method of controlling behavior of document-based user interfaces by actions performed from a system includes determining data entry in a document creation application by a business management application that runs on a platform of the system. The data is entered by a user. The computer-implemented method also includes interacting with the data using a web services application interface of the business management application. The computer-implemented method further includes invoking a rule in the business management application that enables the behavior of the document creation application being controlled by the system. Further, the computer-implemented method includes assigning regulatory controls to the document creation application until completion of an approval process for the data. Moreover, the computer-implemented method includes relinquishing the rule on completion of the approval process.

An example of a computer program product stored on a non-transitory computer-readable medium that when executed by a processor, performs a method for controlling behavior of document-based user interfaces by actions performed from a system includes determining data entry in a document creation application by a business management application that runs on a platform of the system. The data is entered by a user. The computer program product also includes interacting with the data using a web services application interface of the business management application. The computer program product further includes invoking a rule in the business management application that enables the behavior of the document creation application being controlled by the system. Further, the computer program product includes assigning regulatory controls to the document creation application until completion of an approval process for the data. Moreover, the computer program product includes relinquishing the rule on completion of the approval process.

An example of a system includes a non-transitory machine readable medium. The system also includes instructions carried by the machine-readable medium and operable to cause a programmable processor to perform determining data entry in a document creation application by a business management application that runs on a platform of a system, the data being entered by a user, to perform interacting with the data using a web services application interface of the business management application, to perform invoking a rule in the business management that enables behavior of the document creation application being controlled by the system, to perform assigning regulatory controls to the document creation application until completion of an approval process for the data and to perform relinquishing the rule on completion of the approval process.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE FIGURES

In the following drawings like reference numbers are used to refer to like elements. Although the following figures depict various examples of the invention, the invention is not limited to the examples depicted in the figures.

DETAILED DESCRIPTION OF THE EMBODIMENTS

The above-mentioned needs are met by a computer-implemented method and system for utilizing a document creation application as a user interface for communicating with a business management application. The following detailed description is intended to provide example implementations to one of ordinary skill in the art, and is not intended to limit the invention to the explicit disclosure, as one or ordinary skill in the art will understand that variations can be substituted that are within the scope of the invention as described.

A Web Services Description Language of a system, for example a structured database management system or a software application, allows communication between the document creation application and the business management application. In some embodiments, the business management application is accessed using an application programming interface (API) call from the document creation application. The document creation application is explicitly described, those with ordinary skill in the art having the benefit of the disclosure will appreciate that the document creation application can also include, but is not limited to, spreadsheet creation applications; electronic mail applications; applications designed for creating, manipulating, managing, and printing documents in a portable document format (PDF) file; rich text format (RTF) file; a web format; an unstructured data file; other types of documents; presentation creation applications; graphics editing programs; video editing programs; and website design applications.

The system is explicitly described, those with ordinary skill in the art having the benefit of the disclosure will appreciate that the system can also include, but is not limited to, a structured database management system, a software application, an external communication protocol, and a web enterprise application.

In some embodiments, the business management application includes a business lifecycle management application that manages business processes by creating a quote for a prospect or customer, engaging and negotiating an agreement, order management and invoicing and any forms required in a business process that need a document to be communicating and interacting with the business management application. In the present disclosure, a contract creation and contract lifecycle management application accesses a cloud-based structured database management system or software application via an add-in for a word processing application. Although a cloud-based structured database management system or software application is explicitly described, those with ordinary skill in the art having the benefit of the disclosure will appreciate that the invention can also be implemented in a behind firewall database management system with similar effectiveness.

Figure 1:
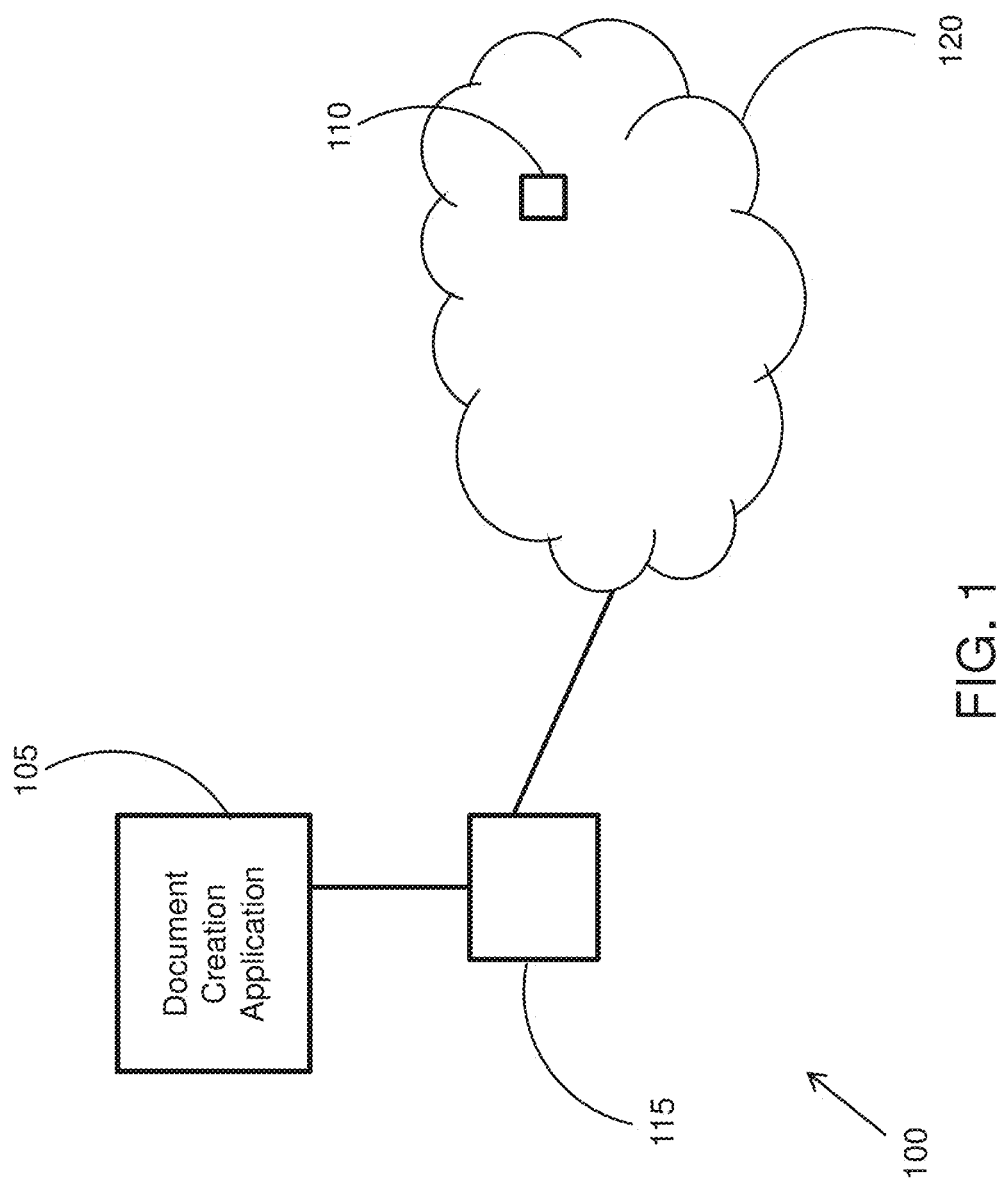
FIG. 1 illustrates an environment for providing a document creation application with access to a business management application, in accordance with one embodiment.

FIG. 1 illustrates an environment 100 for providing a document creation application 105 with access to a business management application 110, in accordance with one embodiment. The business management application 110 is hosted on a cloud-based structured database management system or software application 120 or a behind the firewall application. In some embodiments, the cloud-based structured database management system or software application 120 includes a platform-as-a-service offering, for example as offered by Salesforce®, located at One Market Plaza, Suite 300, San Francisco, Calif., 94105, United States.

The business management application 110 is accessed by the document creation application 105 through a managed add-in 115 that transfers web service calls to the business management application 110 via the structured database management system or software application 120. In one example, the add-in 115 is a web services API. Accordingly, data from the document creation application 105 is accessed by the business management application 110 of the structured database management system or software application 120 via the add-in 115.

In some embodiments, the business management application 110 and the structured database management system or software application 120 require log-in credentials. In some cases, the log-in credentials are similar for both the business management application 110 and the structured database management system or software application 120. In one example, a user enters the log-in credentials of the structured database management system or software application 120 via the document creation application 105.

In some embodiments, once the user logs into the document creation application 105 using the log-in credentials of the structured database management system or software application 120, a session identifier is stored within the add-in 115 such that successive calls can be invoked in same session context until the user logs out of the structured database management system or software application 120.

In some embodiments, the add-in 115 is configured to display one or more of interactive menus, buttons, and text fields, either via windows native to the document creation application 105, browser-based windows common to the structured database management system or software application 120, a combination thereof, or via the document creation application 105.

In some embodiments, a browser-based form loads a dynamic interactive page from the business management application 110 in the structured database management system or software application 120. In one example, the browser-based form loads a dynamic interactive Visualforce® page from a contract lifecycle management product in the Salesforce.com cloud. According to this example, the business management application 110 helps control improvisation to the Visualforce® page, by a customer, in accordance with organizational needs.

According to some embodiments, the business management application 110 includes a contract management application designed for contract administrators and legal users to help streamline the process of creating and maintaining contracts and associated contract and clause templates. Since such users are familiar with drafting, revising, and negotiating contracts using common word processing software, it is desirable to offer benefits and functionality of the contract management application from within a native word processing environment. Using the contract management application, contract administrators can manage complex negotiation cycles, clauses, and contract templates easily.

In some embodiments, the contract management application provides support for versioning of agreements, and contract administrators can save internal, external, and final versions of non-standard language in the word processing application whether accessed locally or via a browser-based interface for accessing the business management application 110. When saving final versions, the contract management application also helps the user to reconcile any terms that might have changed during an approval process. The approval process can, for instance, include electronically sending a notification to a remote site, for example from a point-of-sale electronic appliance running the contract management application to a central office. The notification specifies that a term, whose nature can be specified by how and where it was entered into the contract management application, deviates from specifications designed for the contract management application. (Examples will be given below, in connection with specific embodiments.) The notification can be referred to a suitable authority which can choose to accept non-standard terms, special requests, etc., or which can map the deviation to the nearest specified value, for example by reducing an excessively high dollar-value quotation to a maximum acceptable value. The authority then sends a reply to the remote unit that initiated the approval request. Contract and clause templates can also be managed, including the ability to insert, save as, and replace them to and from the business management application 110. Additionally, users can compare versions of a contract. In some embodiments, the contract management application also provides support for creating conditional text within a contract or clause template. This allows the contract administrators to create sophisticated conditional clauses that can include or exclude certain text or clauses depending on how a conditional expression containing valid agreement related merge fields is evaluated.

In some embodiments, an interactive ribbon menu including different data management tools and present on the document creation application 105 can be used for interaction by the business management application 110 and the structured database management system or software application 120. The ribbon menu can, for instance, be part of a user interface display in a windows-type application. In one embodiment, the ribbon menu can be displayed as a bar of clickable function icons, or as multiple, tab-selectable bars of different clickable function icons, for instance as will be shown and described in connection with FIGS. 3 and 4. The data management tools can include an executable data push-pull utility that pushes and pulls data from a structured field in the document creation application 105 to the structured database management system or software application 120 and stores the data. The executable data push-pull utility further includes authorization tools which require the user of the document creation application 105 to provide authorization before the executable data push-pull utility stores the data in the structured database management system or software application 120.

In some embodiments, one or more of the data management tools perform actions that change the data in the structured database management system or software application 120. Some embodiments involve security protocols and permission verification check before allowing the user to change the data.

Figure 2:
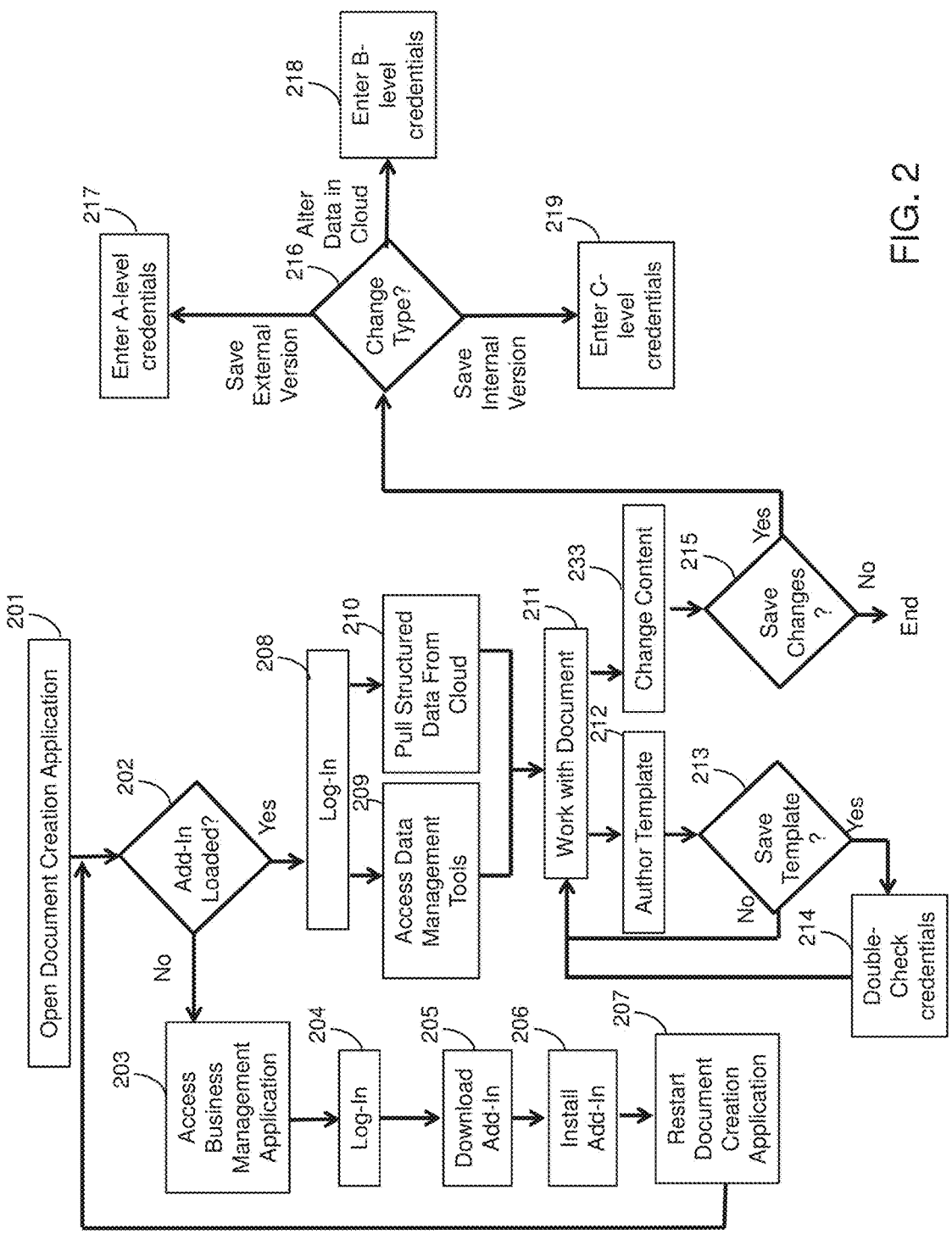
FIG. 2 illustrates a method of controlling behavior of document-based user interfaces by actions performed from a system, in accordance with one embodiment.

FIG. 2 illustrates a method of controlling document-based user interfaces by structured database systems, in accordance with one embodiment. The method begins at step 201 when a user opens a document creation application, for example the document creation application 105 having examples of a word processing application or a spreadsheet creation application. At step 202, it is determined if an add-in, for example the add-in 115, is already loaded.

If the add-in is not loaded, step 203 is performed else step 208 is performed. At step 203, the user accesses a business management application, for example the business management application 110, directly. At step 204, the user logs into the business management application. The user further downloads the add-in at step 205 and installs the add-in at step 206. Once the add-in is installed, the user restarts the document creation application at step 207 to begin using the add-in. If the add-in is already loaded into the document creation application, the user logs in at step 208. In some embodiments, the document creation application asks a user to log-in when the user first attempts to use an add-in ribbon menu.

In some embodiments, logging in includes being challenged with a user name and password. In other embodiments, logging in includes the user entering a username and password and also using a security token if trying to login outside a trusted network of a company. In some embodiments, login processes at step 204 and step 208 involve entering login information of a structured database management system or software application, for example the structured database management system or software application 120, the business management application, or both. According to these embodiments, once the user clicks on a login button, the add-in invokes a web service call to challenge the user credential in the cloud. Upon validation of credentials of the user, the business management application sends the user a login success message along with a session id. If login is unsuccessful then it sends back a fault code for respective error.

Once the user is successfully logged in, the user can access data management tools, at step 209, using the add-in via an interface within the document creation application, pull structured data from the structured database management system or software application cloud at step 210, and work with a document using the document creation application at step 211.

As will be explained in more detail below, the data management tools include tools for using existing templates and authoring new templates. The data management tools can be used by the business management application to control and manage the data entered in the document creation application. In some embodiments of the invention, a button in the ribbon is configured to create agreement templates. The user has an option to either checkout an existing agreement template or author an agreement template from scratch. If the user authors an original template at step 212, the user can choose to save the authored template in the structured database management system or software application, the business management application, or both at step 213. In some embodiments, if the user chooses to save the template, the add-in double-checks the credentials of the user at step 214 to ensure that the user is authorized to save authored templates. If the user does not choose to save the template, then step 211 is performed.

Once a user changes content in the document at step 233 and is finished working with the document, the user can choose whether to save the changes at step 215. Multiple types of versions of the document can be saved and the user can also check data changes. Accordingly, at step 216, types of changes made are determined. Further, various levels of user credentials required for each type of change are determined at step 217, step 218, and at step 219. If the changes are saved as an external version, A-level credentials need to be entered at step 217. If the data is altered in the cloud, B-level credentials need to be entered at step 218. If the changes are saved as an internal version, C-level credentials need to be entered at step 219.

Figure 3:
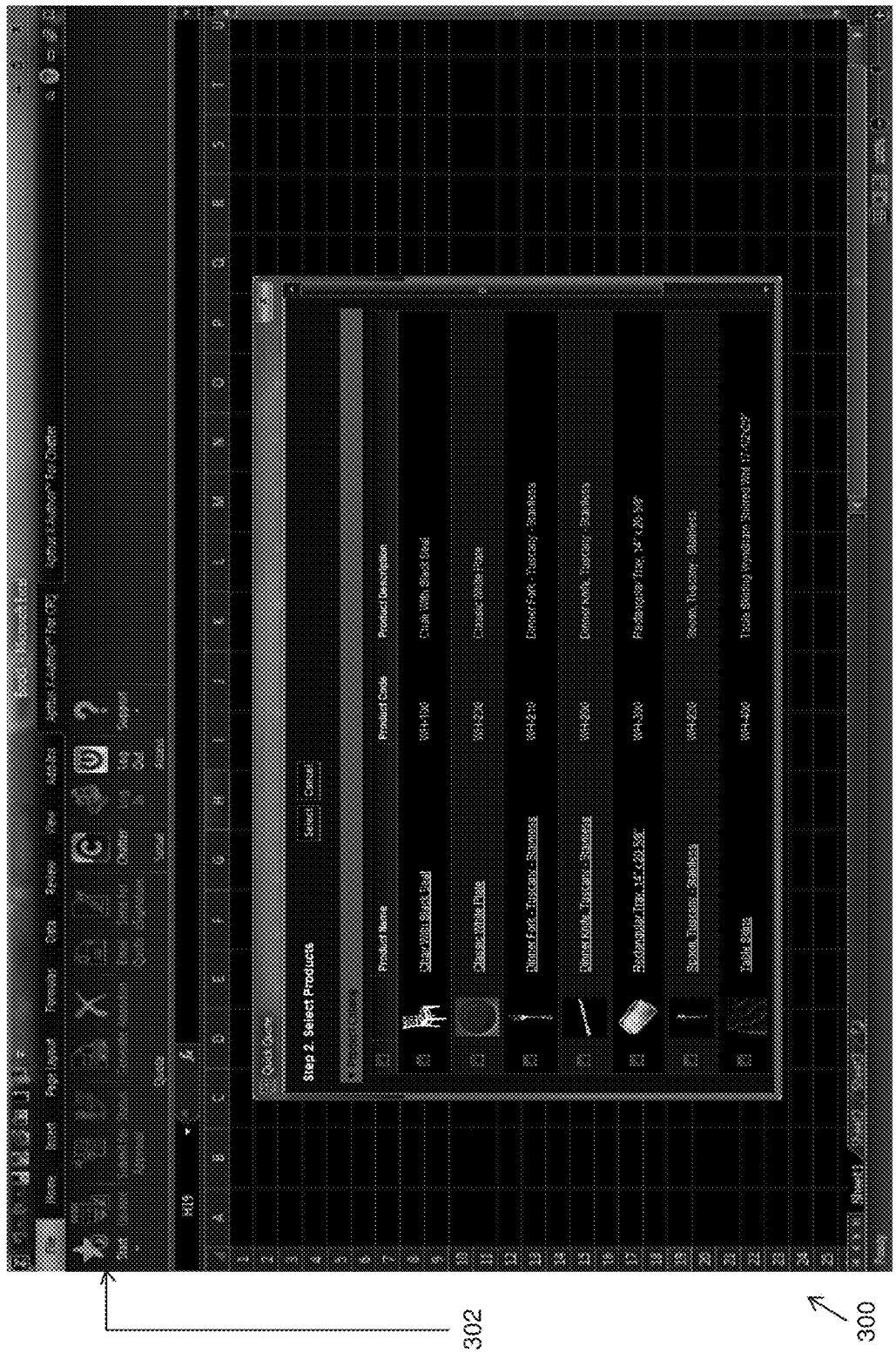
FIG. 3 illustrates an example of a user interface for a spreadsheet creation application that interacts with a business management application via a web services application interface, in accordance with one embodiment.
Figure 4:
FIG. 4 illustrates an example of a user interface for a spreadsheet creation application that interacts with a business management application via a web services application interface, in accordance with another embodiment.

FIG. 3 and FIG. 4 illustrate examples of user interfaces for a spreadsheet creation application 300, for example Microsoft Excel, with an interactive ribbon menu 302 for interacting with a business management application, for example the business management application 110, and a structured database management system or software application, for example the structured database management system or software application 120, via a web services application interface, in accordance with one embodiment. The spreadsheet creation application 300, of the document creation application, has access to the business management application that is hosted on a cloud-based structured database management system or software application or a behind the firewall application.

In some embodiments, the business management application is accessed by the spreadsheet creation application 300 through a managed add-in, for example the add-in 115, that transfers web service calls to the spreadsheet creation application 300 via the structured database management system or software application. Accordingly, the user accesses structured data from the structured database management system or software application as well as the business management application via the spreadsheet creation application 300.

The interactive ribbon menu 302 includes a variety of data management tools for adding collaborative functionality and lifecycle management utility to a word processing document. For example, the data management tools for the spreadsheet creation application 300 are similar to those used for a document creation application.

In one example, the user enters some data, for example a number, in the spreadsheet creation application 300. The structured database application determines that the data is entered in the spreadsheet creation application 300 and a rule is invoked. The rule can pertain to functionality which is relevant to the spreadsheet creation application 300, and/or to parameters set by the user which relate to the spreadsheet creation application 300 or to the data included within a document created by the spreadsheet creation application 300. For instance, suppose the user has typed information into a cell of a spreadsheet document which is defined as containing a numeric value. The rule can check the syntax of the data entered by the user, to confirm that it meets the criteria for a numeric value, for example containing no alpha characters or punctuation marks. The rule can also be set by the user or by a designer of the spreadsheet, in order to comply with requirements for the particular use to which the spreadsheet document is to be applied. For instance, if the data is a number entered into a given cell of the spreadsheet, the spreadsheet designer can have specified that approval is required for a value, entered by the user into the cell, which exceeds a designer-specified standard value. In such case, as the user enters a value into that cell of the spreadsheet, the rule can be invoked when value of the number is higher than a standard value, and an approval is required in order to accept the entered value which exceeds the standard value. The structured database application then assigns regulatory controls to the spreadsheet creation application 300. The regulatory controls can, for instance, specify that edits to other cells can be made but the spreadsheet cannot be finalized and closed, or that the user cannot perform any further work or edits to the spreadsheet, until an approval process is completed in the structured database application. Once the approval process is completed, the regulatory controls can permit that the rule can be relinquished, and then the user can continue to work in the spreadsheet creation application 300.

Similarly, a word processing application, for example Microsoft Word, with an interactive ribbon menu interacts with the business management application and the structured database management system or software application via the web services application interface. The word processing application has access to the business management application that is hosted on the cloud-based structured database management system or software application or the behind the firewall application.

In some embodiments, behavior of the spreadsheet creation application 300 and the word processing application is controlled by performing one or more of preventing the user to take one or more actions, providing guidance to the user through a pop-up menu, providing other information through the pop-up menu, and limiting user control in the document creation application, locking out certain aspects of the document creation application, limiting access to certain aspects of the document creation application, and determining behavior of the document creation application with input.

In some embodiments, the business management application is accessed by the word processing application through the add-in that transfers web service calls to the word processing application via the structured database management system or software application. Accordingly, the user accesses structured data from the structured database management system or software application as well as the business management application via the word processing application.

The interactive ribbon menu includes a variety of data management tools for adding collaborative functionality and lifecycle management utility to a word processing document.

In one example, the user enters some data, for example a word, in the word processing application. The structured database application determines that the data is entered in the word processing application and a rule is invoked. As before, the rule can pertain to functionality which is relevant to the word processing application, and/or to parameters set by the user which relate to the word processing application or to the data contained within a document created by the word processing application. For instance, suppose the user has typed text into a word-processing document. The rule can check the syntax of the data entered by the user, to confirm that it meets the criteria, for example containing no misspelled words. The rule can also be set by the user or by the designer of the word-processing document, in order to comply with requirements for the particular use to which the word-processing document is to be applied. For instance, if the data is text entered at a given position within the document, the designer of the word-processing document can have specified a circumscribed dictionary of possible text values, for example a merchant's list of available products and services, or a merchant's specified set of possible price and service terms. In such case, as the user enters text into that position of the document, the rule can be invoked when spelling of the word does not match any of the entries in a dictionary, and an approval is required in order to accept the entered value which deviates from the circumscribed dictionary of values. The structured database application then assigns regulatory controls to the word processing application. The regulatory controls can, for instance, specify that edits elsewhere within the word processing document can be made but the document may not be finalized and closed, or that the user cannot perform any further work or edits to the document until an approval process is completed in the structured database application. Once the approval process is completed, the regulatory controls can permit that the rule can be relinquished, and then the user can continue to work in the word processing application.

Figure 5:
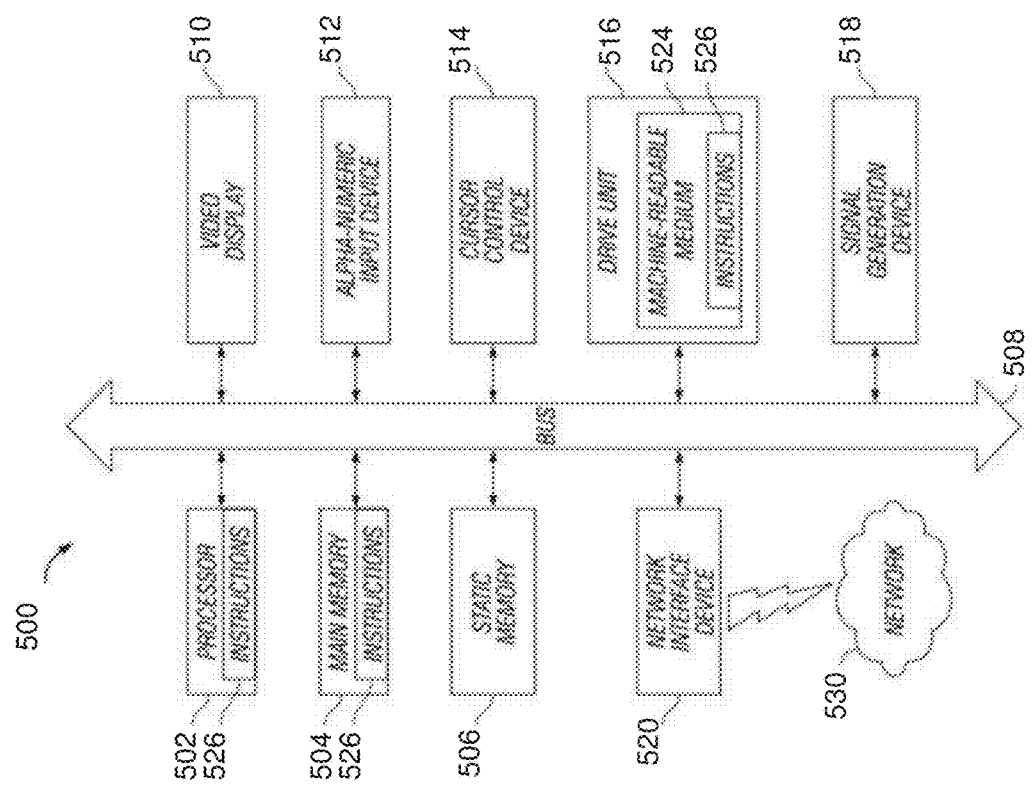
FIG. 5 is a block schematic diagram of a machine in the exemplary form of a computer system within which a set of instructions can be programmed to cause the machine to execute logic steps of the present disclosure, in accordance with one embodiment.

FIG. 5 is a block schematic diagram of a machine in the exemplary form of a computer system 500 within which a set of instructions can be programmed to cause the machine to execute logic steps of the present disclosure, in accordance with one embodiment. In alternative embodiments, the machine can include a network router, a network switch, a network bridge, personal digital assistant (PDA), a cellular telephone, a Web appliance or a machine capable of executing a sequence of instructions that specify actions to be taken by that machine.

The computer system 500 includes a processor 502, a main memory 504 and a static memory 506, which communicate with each other via a bus 508. The computer system 500 can further include a display unit 510, for example, a liquid crystal display (LCD) or a cathode ray tube (CRT). The computer system 500 also includes an alphanumeric input device 512, for example a keyboard; a cursor control device 514, for example a mouse; a disk drive unit 516, a signal generation device 518, for example a speaker, and a network interface device 520.

The disk drive unit 516 includes a machine-readable medium 524 on which is stored a set of executable instructions 526 embodying any one, or all, of the methodologies described herein below. The machine-readable medium 524 can, for instance, include a portable medium separately acquired and installed by the user, for example a preprogrammed CD bearing program software code, for instance the instructions 526. The instructions 526 are also shown to reside, completely or at least partially, within the main memory 504 and/or within the processor 502. The instructions 526 can further be transmitted or received over a network 530 by means of a network interface device 520.

In contrast to the system 500 shown in FIG. 5 and discussed above, a different embodiment uses logic circuitry instead of computer-executed instructions to implement processing entities. Depending upon the particular requirements of the application in the areas of speed, expense, tooling costs, and the like, this logic can be implemented by constructing an application-specific integrated circuit (ASIC) having thousands of tiny integrated transistors. Such an ASIC can be implemented with complementary metal oxide semiconductor (CMOS), transistor-transistor logic (TTL), very large systems integration (VLSI), or another suitable construction. Other alternatives include a digital signal processing chip (DSP), discrete circuitry (for example, resistors, capacitors, diodes, inductors, and transistors), field programmable gate array (FPGA), and programmable logic array (PLA), programmable logic device (PLD).

It is to be understood that embodiments may be used as or to support software programs or software modules executed upon some form of processing core (for example the CPU of a computer) or otherwise implemented or realized upon or within a machine or computer readable medium. A machine-readable medium includes any mechanism for storing or transmitting information in a form readable by a machine, for example a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, or any other type of media suitable for storing or transmitting information.

As will be understood by those familiar with the art, the invention may be embodied in other specific forms without departing from the spirit or essential characteristics thereof. Likewise, the particular naming and division of the members, features, attributes, and other aspects are not mandatory or significant, and the mechanisms that implement the invention or its features may have different names, divisions and/or formats. Accordingly, the disclosure of the invention is intended to be illustrative, but not limiting, of the scope of the invention, which is set forth in the following Claims.

The invention claimed is:

1. A computer-implemented method for controlling behavior of document-based user interfaces by actions performed from a system, the computer-implemented method comprising:
    entering log-in credentials via a document creation application to log-in to both a business management application and the document creation application;
    determining data entry in the document creation application by the business management application that runs on a platform of the system, wherein the data is entered by a user; and wherein the business management application is external to the document creation application;
    interacting with the data using a web services application interface of the business management application; and
    controlling the behavior of the document creation application by the business management application comprising:
    invoking a rule in the business management application that enables the behavior of the document creation application being controlled by the system;
    assigning regulatory controls to the document creation application until completion of an approval process for the data; and
    relinquishing the rule on completion of the approval process.

2. The computer-implemented method as claimed in claim 1, wherein the system comprises one of a structured database management system, a software application, an external communication protocol, and a web enterprise application.

3. The computer-implemented method as claimed in claim 1, wherein the document creation application comprises one or more of a word processing application, a spreadsheet creation application, a presentation creation application, a web format, an unstructured data file, a rich text format file, a portable document file, a document, and an electronic mail application.

4. The computer-implemented method as claimed in claim 3, wherein the document creation application is configured with an add-in comprising instructions for linking the document creation application with one of the business management application and the system.

5. The computer-implemented method as claimed in claim 4, wherein the add-in comprises a plugin in the document creation application.

6. The computer-implemented method as claimed in claim 1, wherein the behavior of the document creation application is controlled by performing one or more of preventing the user to take one or more actions, providing guidance to the user through a pop-up menu, providing other information through the pop-up menu, and limiting user control in the document.

7. The computer-implemented method as claimed in claim 1, wherein the business management application comprises a business lifecycle management application that manages business processes.

8. The computer-implemented method as claimed in claim 1, wherein the business management application comprises a contract creation and contract lifecycle management application.

9. The computer-implemented method as claimed in claim 1, wherein the document creation application is a user interface for the business management application.

10. The computer-implemented method as claimed in claim 1, wherein the document creation application comprises data management tools.

11. The computer-implemented method as claimed in claim 10, wherein the data management tools further comprise:
an executable data push-pull utility that pushes and pulls data from a structured field in the document creation application to the system and stores the data.

12. The computer-implemented method as claimed in claim 11, wherein the executable data push-pull utility further comprises authorization tools which require the user of the document creation application to provide authorization before the executable data push-pull utility stores the data in the system.

13. A computer program product stored on a non-transitory computer-readable medium that when executed by a processor, performs a method for controlling behavior of document-based user interfaces by actions performed from a system, the computer-implemented method comprising:
entering log-in credentials via a document creation application to log-in to both a business management application and the document creation application;
determining data entry in the document creation application by the business management application that runs on a platform of the system, wherein the data is entered by a user, and wherein the business management application is external to the document creation application;
interacting with the data using a web services application interface of the business management application; and
controlling the behavior of the document creation application by the business management application comprising:
invoking a rule in the business management application that enables the behavior of the document creation application being controlled by the system;
assigning regulatory controls to the document creation application until completion of an approval process for the data; and
relinquishing the rule on completion of the approval process.

14. The computer program product as claimed in claim 13, wherein the system comprises one of a structured database management system, a software application, an external communication protocol, and a web enterprise application.

15. The computer program product as claimed in claim 13, wherein the document creation application comprises one or more of a word processing application, a spreadsheet creation application, a presentation creation application, a web format, an unstructured data file, a rich text format file, a portable document file, a document, and an electronic mail application.

16. The computer program product as claimed in claim 15, wherein the document creation application is configured with an add-in comprising instructions for linking the document creation application with one of the business management application and the system.

17. The computer program product as claimed in claim 16, wherein the add-in comprises a plugin in the document creation application.

18. The computer program product as claimed in claim 13, wherein the behavior of the document creation application is controlled by performing one or more of preventing the user to take one or more actions, providing guidance to the user through a pop-up menu, providing other information through the pop-up menu, and limiting user control in the document.

19. The computer program product as claimed in claim 13, wherein the business management application comprises a business lifecycle management application that manages business processes.

20. The computer program product as claimed in claim 13, wherein the business management application comprises a contract creation and contract lifecycle management application.

21. The computer program product as claimed in claim 13, wherein the document creation application is a user interface for the business management application.

22. The computer program product as claimed in claim 13, wherein the document creation application comprises data management tools.

23. The computer program product as claimed in claim 22, wherein the data management tools further comprise:
an executable data push-pull utility that pushes and pulls data from a structured field in the document creation application to the system and stores the data.

24. The computer program product as claimed in claim 23, wherein the executable data push-pull utility further comprises authorization tools which require the user of the document creation application to provide authorization before the executable data push-pull utility stores the data in the system.

25. A system comprising:
a non-transitory machine readable medium; and
instructions carried by the machine-readable medium and operable to cause a programmable processor to perform:
entering log-in credentials via a document creation application to log-in to both a business management application and the document creation application;
determining data entry in the document creation application by the business management application that runs on a platform of a system, wherein the data is entered by a user; and wherein the business management application is external to the document creation application;
interacting with the data using a web services application interface of the business management application; and
controlling the behavior of the document creation application by the business management application comprising:

invoking a rule in the business management application that enables behavior of the document creation application being controlled by the system;

assigning regulatory controls to the document creation application until completion of an approval process for the data; and relinquishing the rule on completion of the approval process.

26. The system as claimed in claim 25, wherein the system comprises one of a structured database management system, a software application, an external communication protocol, and a web enterprise application.

27. The system as claimed in claim 25, wherein the document creation application comprises one or more of a word processing application, a spreadsheet creation application, a presentation creation application, a web format, an unstructured data file, a rich text format file, a portable document file, a document, and an electronic mail application.

28. The system as claimed in claim 25, wherein the behavior of the document creation application is controlled by performing one or more of preventing the user to take one or more actions, providing guidance to the user through a pop-up menu, providing other information through the pop-up menu, and limiting user control in the document.

29. The system as claimed in claim 25, wherein the document creation application comprises data management tools.

30. The system as claimed in claim 29, wherein the data management tools further comprise:

an executable data push-pull utility that pushes and pulls data from a structured field in the document creation application to the system and stores the data, wherein the executable data push-pull utility further comprises authorization tools which require a user of the document creation application to provide authorization before the executable data push-pull utility stores the data in the system.

\* \* \* \* \*